United States Patent Office 2,810,771
Patented Oct. 22, 1957

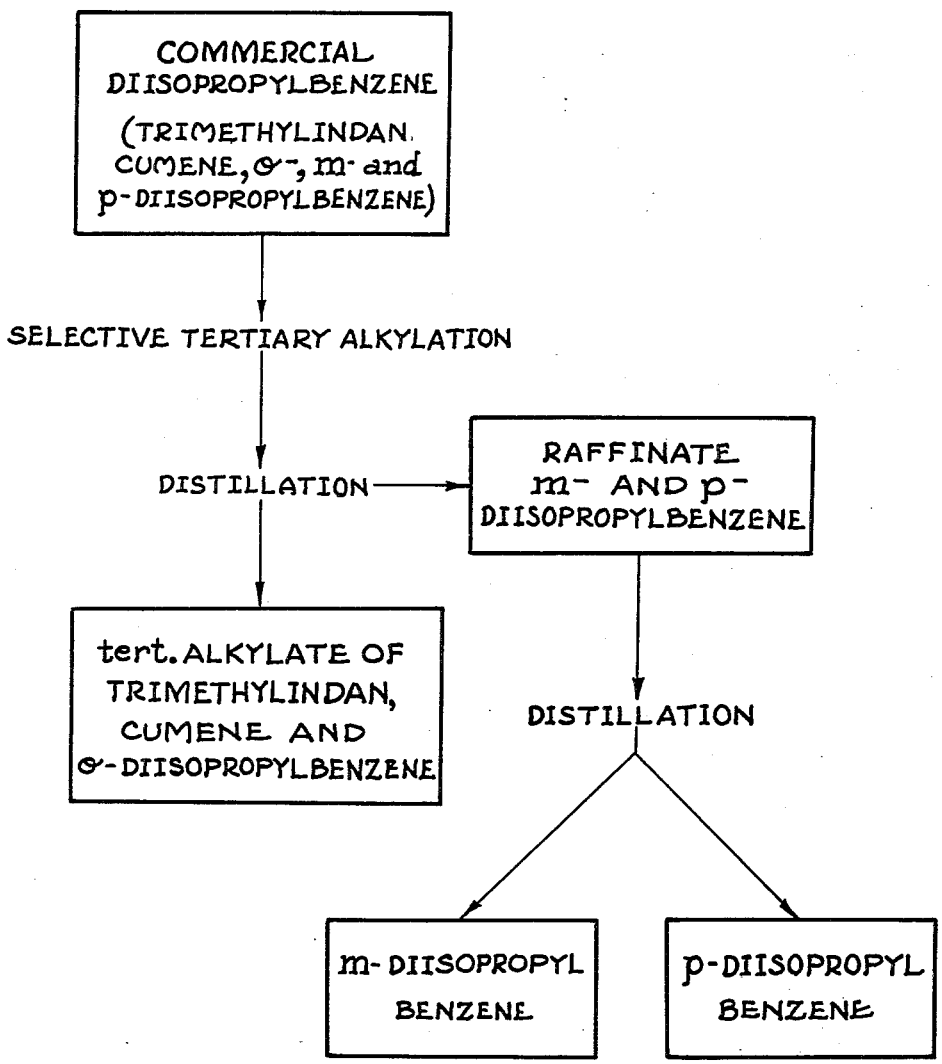

2,810,771

TERTIARY ALKYLATION OF IMPURITIES IN CRUDE DIISOPROPYLBENZENE MIXTURES

Raymond C. Odioso, Pittsburgh, Pa., assignor to Koppers Company, Inc., a corporation of Delaware Application January 20, 1954, Serial No. 405,078

14 Claims. (Cl. 260—674)

This invention relates to a method for recovering increased values from crude or commercial isomeric diisopropylbenzene mixtures. It also relates to a method for removing certain impurities together with some or all of the o-diisopropylbenzene from a mixture also containing m- and p-diisopropylbenzene so that substantially pure m- and p-diisopropylbenzene can be separately recovered. It further relates to an improved method for preparing hydroperoxides from crude diisopropylbenzene.

Applicant has found that commercial diisopropylbenzene contains trimethylindan as the major impurity in the amount of about 5 percent to about 15 percent and small amounts of isopropylbenzene and 2-phenyl-2,3-dimethylbutane. Whether the trimethylindan impurity is the 1,1,2- or the 1,1,3-trimethylindan, or perhaps a mixture, is not yet possible of analytic determination. Accordingly the term "trimethylindan" will be used hereafter to include one or more isomeric trimethylindans. These impurities have made it impossible previously to prepare relatively pure isomeric diisopropylbenzenes by conventional methods, either as a mixture of isomers or as separate isomers. Applicant has found that sulfonation-desulfonation is not practical for removing these impurities because of the non-selectivity of sulfonation and because the closely similar hydrolysis temperatures of the trimethylindan and diisopropylbenzene sulfonates. He has also found that distillation is impractical for removal of trimethylindan and separation therefrom of the three diisopropylbenzene isomers because of an overlapping in boiling points of these constituents of crude or commercial diisopropylbenzenes. The following table points out the distillation difficulties:

TABLE I

B. P., 760 mm. Hg pressure, ° C.

| | |
|---|---|
| o-Diisopropylbenzene | 203.8 |
| m-Diisopropylbenzene | 203.2 |
| 1,1,2-trimethylindan | 208.0 |
| 1,1,3-trimethylindan | 206–209.0 |
| p-Diisopropylbenzene | 210.4 |

It is desirable to remove the impurities so that relatively pure diisopropylbenzenes can be prepared. This is of particular importance in the preparation of divinylbenzenes and diisopropenylbenzenes for which the diisopropylbenzenes are intermediates.

It also has been found that trimethylindan acts as an inhibitor in the hydroperoxidation of m- and p-diisopropylbenzenes to their corresponding mono- and di-hydroperoxides, and since trimethylindan can be formed from o-diisopropylbenzene, it is necessary to remove the latter prior to hydroperoxidation of the m- and p-diisopropylbenzenes.

In accordance with the present invention, it has now been discovered that crude or commercial diisopropylbenzene can be alkylated with a tertiary-alkylating agent so that impurities as discussed above or such impurities and o-diisopropylbenzene can be selectively tertiary-alkylated to the substantial exclusion of the m- and p-diisopropylbenzenes. Thereafter the reaction mixture is distilled to separate a relatively low boiling raffinate containing m- and p-diisopropylbenzene and a relatively high boiling fraction containing tertiary-alkylated impurities with or without tertiary-alkylated o-diisopropylbenzene, as desired.

By tertiary-alkylating agent is meant an alkylating agent which has a reactive carbon atom attached to three other carbon atoms, such as t-butyl chloride, t-butanol, isobutylene, 2-chloro-2-methylbutane, 2-methylbutene-2, etc., including, in addition to halides, olefins and other alkylating agents in which the reactive carbon is doubly bonded or has halogen or hydroxy group attached thereto, those compounds which sometimes under alkylating conditions react in a manner to give t-alkyl derivatives, such as 2-methylbutene-3, 2-chloro-2-methylbutane, 2-methylpentene-3, etc.

The method of practicing the present invention is illustrated in the drawing, which shows the steps involved in removing the impurities together with some or all of the o-diisopropylbenzene from a crude mixture of isomeric diisopropylbenzenes. The drawing also shows how the m- and p-diisopropylbenzene are recovered separately from a processed crude diisopropylbenzene.

In practicing the invention, crude isomeric diisopropylbenzenes containing the aforesaid impurities are subjected to tertiary-alkylation with a tertiary-alkylating agent, such as isobutylene; isoamylenes, such as 2-methylbutene-1, 2-methylbutene-2; isohexylenes, such as 2-methylpentene-1,2-methylpentene-2, 3-methylpentene-2, and 2,3-dimethylbutene-2; tertiary octylenes, such as 2,2,4-trimethylpentene-4, 2,4-dimethylhexene-2, and 2,4-dimethylhexene-3; corresponding tertiary-alcohols, such as t-amyl alcohol, 2,4,4-trimethylpentanol-2, etc. and corresponding tertiary-alkyl halides, such as tertiary-butyl chlorides, tertiary-amyl chloride, 2-methyl-2-chloro-heptane, etc., or mixtures of any two or more thereof. Various well-known alkylation catalysts, such as boron trifluoride, hydrogen fluoride, $H_2SO_4$, ferric chloride, various clay-type alkylation catalysts including the synthetic alumina-silica types, etc. may be used, but hydrogen fluoride, $H_2SO_4$, and ferric chloride alone or with hydrogen chloride are advantageous.

For efficient separation a ratio of about 1.2 moles or more of alkylating agent per mole of impurities or impurities plus o-diisopropylbenzene is desirable. While larger proportions of alkylating agent can often be used, there is generally no advantage in using more than 4 moles of alkylating agent per mole of impurities or impurities plus o-diisopropylbenzene, since with a greater excess of alkylating agent the yield of m- and p-diisopropylbenzene is reduced. Less than sufficient tertiary-alkylating agent to remove all of the o-diisopropylbenzene is used when the presence of some o-diisopropylbenzene is not objectionable. The optimum ratio will vary with the particular catalyst being used, generally in accordance with the competing tendency of the catalyst to promote polymerization by-products. For example, hydrogen fluoride, which has been found to give about the least amount of polymer by-product, can be used advantageously to give complete removal of the impurities aforesaid and the o-diisopropylbenzene as desired when used in the ratio of alkylating agent to impurities (and o-diisopropylbenzene, as desired) of at least about 1.2 to 1. With other catalysts which give more polymer by-products, such as sulfuric acid, a molar ratio of 2–4 to 1 is advantageous. A reaction temperature of −10 to 60° C. is advantageously used. It was surprising to find that, with a single tertiary-alkylation, such impurities as trimethylindan, isopropylbenzene, and 2-phenyl-2,3-dimethylbutane, as well as the sometimes objectionable o-diisopropylbenzene can be selectively tertiary-alkylated by this method to give a relatively high boiling alkylate, which can be distillatively separated from a raffinate containing m- and p-diisopropylbenzene, thus permitting the facile and efficient separation of m- and p- diisopropylbenzene from a crude diisopropylbenzene. A mixture of m- and p-diisopropylbenzene is readily separated by distillation since their boiling points are about 7° C. apart.

The following examples illustrate the present invention. To facilitate expression, the impurities in crude diisopropylbenzene will be referred to herein and in the appended claims as "impurities including trimethylindan," it being understood that accompanying impurities, such as isopropylbenzene and 2-phenyl-2,3-dimethylbutane which are also usually present in small amounts, are removable together with the selective tertiary-alkylate of trimethylindan. Proportions are by weight unless otherwise indicated. Various isomer contents are determined by infrared spectrometric analysis.

*Example I*

Isobutylene (17.4 moles) is passed into a stirred, cooled (0–10° C.) mixture of 3240 grams (20 moles) of diisopropylbenzene (composition: 19 mole percent trimethylindan, including a small amount of isopropylbenzene, 9 mole percent o-, 44 mole percent m-, and 28 mole percent of p-diisopropylbenzene) and 325 grams (3.3 moles) of 96 percent sulfuric acid over a period of 8 hours at a rate sufficient to maintain saturation thereof. The hydrocarbon layer is separated, washed with water, refluxed with caustic to neutralize free acid, and hydrolyze sulfonate, and distilled at 20 mm. Hg in a 23-plate distillation column at a 5/1 reflux ratio. There is obtained a raffinate from which 100 percent of the trimethylindan and 85 percent of the o-diisopropylbenzene are removed, boiling at 92.5–127.5° C. at 20 mm. Hg pressure. The yield is 69 percent based on crude feed. The molar proportion of isobutylene to impurities plus o-diisopropylbenzene is 3.1:1. To remove all of the o-diisopropylbenzene, it is advantageous to increase the input of isobutylene, or to decrease the formation of isobutylene polymer by reducing the reaction temperature to, for example, −10° C., or by using anhydrous hydrogen fluoride as catalyst. With hydrogen fluoride as catalyst, the ratio of isobutylene to impurities plus o-diisopropylbenzene is reduced to approximately 1.2:1 to give similar advantageous results. The m- and p-diisopropylbenzene are separated by distillation at standard pressure or under reduced pressure.

The procedure is repeated using instead of isobutylene, 2-methylbutene-1, 2-methylpentene-1, and 2,2,4-trimethylpentene-3 as alkylating agents, and similar advantageous results are obtained.

*Example II*

To 486 g. (3 moles) of a cold (0–5° C.) diisopropylbenzene mixture (composition: 4 percent isopropylbenzene, 9 percent o-, 44 percent m-, 28 percent p-diisopropylbenzene, 15 percent trimethylindan) contained in a 2-liter flask equipped with stirrer, thermometer, and dropping funnel is added 48.6 g. of anhydrous ferric chloride. To the stirred, cooled mixture, 368 g. (4 moles) of t-butyl chloride is added over a period of two hours. The reaction mixture is stirred at room temperature until the evolution of hydrogen chloride has ceased. The reaction mixture is poured onto ice and the hydrocarbon layer is separated. The hydrocarbon is washed with water and dilute caustic, dried and distilled to give 140 g. (0.86 mole) of raffinate (composition: 1 percent isopropylbenzene, 1 percent o-, 59 percent m-, 39 percent p-diisopropylbenzene and 0 percent trimethylindan) and 301 g. of selective alkylate. The molar proportion of t-butyl chloride to impurities plus o-diisopropylbenzene is 3.1:1. By increasing the addition of t-butyl chloride or reducing the reaction temperature to, for example, −10° C., a raffinate is obtained free of all impurities and of o-diisopropylbenzene.

This procedure is repeated using instead of t-butyl chloride, 2-chloro-2-methylbutane, 3-chloro-3-methylpentane, 2-chloro-2-methylhexane, and 2-chloro-2,4,4-trimethylpentane, and similar advantageous results are obtained.

*Example III*

The hydroperoxidation of m-diisopropylbenzene is performed using the following charge and the procedure described below:

| | |
|---|---:|
| m-Diisopropylbenzene, ortho-free and free from impurities including trimethylindan, prepared by the method of Example I | 171.6 |
| m-Diisopropylbenzene hydroperoxide, 100 percent basis [1] | 1.13 |
| Water | 400.0 |
| Stearic acid, C. P. | 1.75 |
| Sodium hydroxide | 4.0 |
| Sodium pyrophosphate decahydrate | 7.0 |
| Temperature, ° C. | 82–83 |
| Time, hours | 50.5 |

[1] Initiator: 56 percent solution of technical m-diisopropylbenzene monohydroperoxide in m-diisopropylbenzene.

The diisopropylbenzene, in which the stearic acid is dissolved and to which the initiator solution is then added, is added with stirring to the aqueous solution containing the sodium pyrophosphate and sodium hydroxide, to give an oil-in-water emulsion, stabilized by in situ formation of sodium stearate. Oxygen is bubbled through the reaction medium for 50.5 hours at 82–83° C. with stirring at a rate sufficient to maintain saturation thereof. A product containing 29–32 percent m-diisopropylbenzene dihydroperoxide is obtained. With an m-diisopropylbenzene containing trimethylindan, obtained from sulfuric acid-washed, alkali-neutralized and fractionally-distilled crude diisopropylbenzene containing 19 mole percent impurities including trimethylindan, 9 mole percent o-, 44 mole percent m- and 28 mole percent p-diisopropylbenzene, only trace amounts of the dihydroperoxide are obtained by use of the same procedure. Air is used in place of oxygen with equally advantageous results, and other initiators for hydroperoxidation, such as known in the art, can be used advantageously.

*Example IV*

The procedure of Example III is repeated, using p-diisopropylbenzene hydroperoxide as initiator and pure p-diisopropylbenzene prepared by the method of Example I. The p-diisopropylbenzene dihydroperoxide upon formation precipitates out from the aqueous soap phase, is filtered off and washed free of soap and sodium pyrophosphate with cold water, and dried under vacuum at room temperature to give yields of dihydroperoxide of about 34 percent. By recycling and further hydroperoxidation of the monohydroperoxide of p-diisopropylbenzene and unreacted p-diisopropylbenzene remaining in the reaction medium, the overall yield of dihydroperoxide can be considerably increased. The p-diisopropylbenzene dihydroperoxide is decomposed in known manner to give hydroquinone of high purity.

*Example V*

A mixture of approximately equal parts of m- and p-diisopropylbenzene free from ortho-isomer and impurities containing trimethylindan is similarly hydroperoxidized. A yield of about 35 percent dihydroperoxide is obtained. As pointed out earlier, removal of o-diisopropylbenzene is desirable since it can give rise to trimethylindan in processing and reaction, which inhibits hydroperoxidation of the m- and p-diisopropylbenzene.

The present invention may also be used to remove impurities of the type described herein from a composition containing only m- or p-diisopropylbenzene or a mixture of any two diisopropylbenzene isomers. For example a fraction containing only o- and m-diisopropylbenzene and impurities including trimethylindan is effectively treated to remove the impurities and all or part of the o-isomer by the procedure of Example I. Likewise compositions containing only the m-isomer or the p-isomer or a mixture of only the m- and p-isomers or a mixture of only the o- and p-isomers give similar advantageous results upon such treatment.

Obviously many modifications and variations of the invention as hereinbefore set forth may be made without departing from the spirit and scope thereof and therefore only such limitations should be imposed as are indicated in the appended claims.

The invention claimed is:

1. Method for recovering increased values from mixed isomeric diisopropylbenzenes containing impurities including trimethylindan, which includes the steps of selectively tertiary-alkylating said diisopropylbenzene mixture with a tertiary-alkylating agent in amount sufficient to tertiary-alkylate the impurities including trimethylindan in the presence of an alkylation catalyst and separating the tertiary-alkylate fraction from the remaining raffinate, the molar ratio of alkylating agent to impurities including trimethylindan being up to 4 to 1.

2. Method for recovering increased values from mixed isomeric diisopropylbenzenes containing impurities including trimethylindan, which includes the steps of selectively tertiary-alkylating said diisopropylbenzene mixture with a tertiary-alkylating agent in amount sufficient to tertiary-alkylate the impurities including trimethylindan and at least some of the o-diisopropylbenzene in the presence of an alkylation catalyst and separating the tertiary-alkylate fraction from the remaining raffinate.

3. Method for recovering increased values from mixed isomeric diisopropylbenzenes containing impurities including trimethylindan, which includes the steps of selectively tertiary-alkylating said diisopropylbenzene mixture with a tertiary-alkylating agent in amount sufficient to tertiary-alkylate the impurities including trimethylindan and at least some of the o-diisopropylbenzene in the presence of an alkylation catalyst, separating the tertiary-alkylate fraction from the remaining raffinate and distilling the raffinate to recover m-diisopropylbenzene and p-diisopropylbenzene, the molar ratio of alkylating agent to impurities including trimethylindan being up to 4 to 1.

4. Method for recovering increased values from mixed isomeric diisopropylbenzenes containing impurities including trimethylindan, which includes the steps of selectively tertiary-alkylating said diisopropylbenzene mixture with a tertiary-olefin, the molar ratio of tertiary-olefin to impurities including trimethylindan plus o-diisopropylbenzene being between about 1.2–4 to 1, in the presence of an alkylation catalyst and separating the tertiary-alkylate fraction from the remaining raffinate.

5. Method for recovering increased values from mixed isomeric diisopropylbenzenes containing impurities including trimethylindan, which includes the steps of selectively tertiary-alkylating said diisopropylbenzene mixture with a tertiary-olefin, the molar ratio of tertiary-olefin to impurities including trimethylindan plus o-diisopropylbenzene being between about 1.2–4 to 1, in the presence of an alkylation catalyst, separating the tertiary-alkylate fraction from the remaining raffinate and distilling the raffinate to recover m-diisopropylbenzene and p-diisopropylbenzene.

6. Method for recovering increased values from mixed isomeric diisopropylbenzenes containing impurities including trimethylindan, which includes the steps of selectively tertiary-alkylating said diisopropylbenzene mixture with a tertiary-olefin, the molar ratio of tertiary-olefin to impurities including trimethylindan plus o-diisopropylbenzene being between about 1.2–4 to 1, in the presence of sulfuric acid catalyst and separating the tertiary-alkylate fraction from the remaining raffinate.

7. Method for recovering increased values from mixed isomeric diisopropylbenzenes containing impurities including trimethylindan, which includes the steps of selectively tertiary-alkylating said diisopropylbenzene mixture with a tertiary-olefin, the molar ratio of tertiary-olefin to impurities including trimethylindan plus o-diisopropylbenzene being between about 1.2–4 to 1, in the presence of hydrogen fluoride catalyst and separating the tertiary-alkylate fraction from the remaining raffinate.

8. Method for recovering increased values from mixed isomeric diisopropylbenzenes containing impurities including trimethylindan, which includes the steps of selectively tertiary-alkylating said diisopropylbenzene mixture with a tertiary-olefin, the molar ratio of tertiary-olefin to impurities including trimethylindan plus o-diisopropylbenzene being between about 1.2–4 to 1, in the presence of sulfuric acid catalyst, separating the tertiary-alkylate fraction from the remaining raffinate, and distilling the raffinate to recover m-diisopropylbenzene and p-diisopropylbenzene.

9. Method for recovering increased values from mixed isomeric diisopropylbenzenes containing impurities including trimethylindan, which includes the steps of selectively tertiary-alkylating said diisopropylbenzene mixture with a tertiary-olefin, the molar ratio of tertiary-olefin to impurities including trimethylindan plus o-diisopropylbenzene being between about 1.2–4 to 1, in the presence of hydrogen fluoride catalyst, separating the tertiary-alkylate fraction from the remaining raffinate, and distilling the raffinate to recover m-diisopropylbenzene and p-diisopropylbenzene.

10. Method for recovering increased values from mixed isomeric diisopropylbenzenes containing impurities including trimethylindan, which includes the steps of selectively tertiary-alkylating said diisopropylbenzene mixture with isobutylene, the molar ratio of isobutylene to impurities including trimethylindan plus o-diisopropylbenzene being between about 1.2–4 to 1 in the presence of an alkylation catalyst, and separating the tertiary-butylate fraction from the remaining raffinate.

11. Method for recovering increased values from mixed isomeric diisopropylbenzenes containing impurities including trimethylindan, which includes the steps of selectively tertiary-alkylating said diisopropylbenzene mixture with isobutylene, the molar ratio of isobutylene to impurities including trimethylindan plus o-diisopropylbenzene being between about 1.2–4 to 1 in the presence of an alkylation catalyst, separating the tertiary-butylate fraction from the remaining raffinate and distilling the raffinate to recover m-diisopropylbenzene and p-diisopropylbenzene.

12. Method for recovering increased values from mixed isomeric diisopropylbenzenes containing impurities including trimethylindan, which includes the steps of selectively tertiary-alkylating said diisopropylbenzene mixture with isobutylene, the molar ratio of isobutylene to impurities including trimethylindan plus o-diisopropylbenzene being between about 1.2–4 to 1, in the presence of sulfuric acid catalyst, separating the tertiary-butylate fraction from the remaining raffinate and distilling the raffinate to recover m-diisopropylbenzene and p-diisopropylbenzene.

13. Method for recovering increased values from mixed isomeric diisopropylbenzenes containing impurities including trimethylindan, which includes the steps of selectively tertiary-alkylating said diisopropylbenzene mixture with isobutylene, the molar ratio of isobutylene to impurities including trimethylindan plus o-diisopropylbenzene being between about 1.2–4 to 1, in the presence of hydrogen fluoride catalyst, separating the tertiary-butylate fraction from the remaining raffinate and distilling the raffinate to recover m-diisopropylbenzene and p-diisopropylbenzene.

14. Method for recovering increased values from a composition containing a member of the class consisting of m-diisopropylbenzene, p-diisopropylbenzene and mixtures containing at least two of the diisopropylbenzene isomers and also containing impurities including trimethylindan, which includes the steps of selectively tertiary-alkylating said composition with a tertiary-alkylating agent in amount sufficient to tertiary-alkylate the impurities including trimethylindan in the presence of an alkylation catalyst and separating the tertiary-alkylate fraction from the remaining raffinate, the molar ratio of alkylating agent to impurities including trimethylindan being up to 4 to 1.

References Cited in the file of this patent

UNITED STATES PATENTS 2,648,713    Schneider    Aug. 11, 1953

FOREIGN PATENTS 646,102    Great Britain    Nov. 15, 1950

OTHER REFERENCES

Kutz et al.: J. Am. Chem. Soc., vol. 70, pages 4026–31 (pages 4026–28 needed only), December 1948.